United States Patent
Yamanishi et al.

(10) Patent No.: US 9,511,465 B2
(45) Date of Patent: Dec. 6, 2016

(54) PRECISION MACHINE TOOL

(71) Applicant: Toshiba Kikai Kabushiki Kaisha, Tokyo (JP)

(72) Inventors: Norio Yamanishi, Numazu (JP); Hiroshi Utimura, Numazu (JP)

(73) Assignee: TOSHIBA KIKAI KABUSHIKI KAISHA, Tokyo-To (JP)

(*) Notice: Subject to any disclaimer, the term of this patent is extended or adjusted under 35 U.S.C. 154(b) by 523 days.

(21) Appl. No.: 13/935,330

(22) Filed: Jul. 3, 2013

(65) Prior Publication Data

US 2014/0010611 A1 Jan. 9, 2014

(30) Foreign Application Priority Data

Jul. 5, 2012 (JP) .................. 2012-151498

(51) Int. Cl.
- B23Q 11/14 (2006.01)
- B23Q 11/12 (2006.01)
- B23Q 11/00 (2006.01)

(52) U.S. Cl.
CPC ........... *B23Q 11/126* (2013.01); *B23Q 11/141* (2013.01); *B23Q 11/0003* (2013.01); *B23Q 11/127* (2013.01); *B23Q 11/128* (2013.01); *Y10T 409/303976* (2015.01)

(58) Field of Classification Search
CPC ..... B23Q 11/0003; B23Q 11/10; B23Q 11/12; B23Q 11/126; B23Q 11/127; B23Q 11/128; B23Q 11/14; B23Q 11/141; B23Q 11/146
USPC .................. 409/135, 136
IPC ....................... B23Q 11/14
See application file for complete search history.

(56) References Cited

U.S. PATENT DOCUMENTS

| | | | | |
|---|---|---|---|---|
| 2,279,569 A * | 4/1942 | Jelinek | ................. | B23Q 1/015 29/37 R |
| 3,303,731 A * | 2/1967 | Zawistowski | ........ | B23Q 11/141 82/117 |
| 4,952,105 A * | 8/1990 | Kitamura | ............. | B23Q 11/127 408/234 |
| 6,923,603 B2 * | 8/2005 | Muto | ..................... | B23Q 1/015 409/135 |
| 8,317,440 B2 * | 11/2012 | Rogers | ............... | B23Q 11/0039 408/143 |

(Continued)

FOREIGN PATENT DOCUMENTS

| | | |
|---|---|---|
| CN | 201960408 | 9/2011 |
| GB | 1063904 | 4/1967 |

(Continued)

OTHER PUBLICATIONS

Machine translation of JP 2011-073108, printed Sep. 2015.*
English Language Abstract of JP 05-309536 published Nov. 22, 1993.
English Language Translation of JP 05-309536 published Nov. 22, 1993.

(Continued)

*Primary Examiner* — Daniel Howell
(74) *Attorney, Agent, or Firm* — DLA Piper LLP (US)

(57) ABSTRACT

In a precision machine tool wherein a spindle head 20 that is movable in the up and down direction is disposed on a column 14 disposed on a bed 10 and a water storage space for storing temperature-regulated cooling water is formed inside the column 14, the column 14 has, in a lower part thereof, intake ports 38a and 38b through which cooling water is led into the water storage space, the column 14 has, in an upper part thereof, a drain opening 40 through which a cooling water is led outside, and an air vent hole 49 through which air in the column is discharged is formed at a position higher than the drain opening 40.

12 Claims, 5 Drawing Sheets

(56) References Cited

U.S. PATENT DOCUMENTS

| | | | | |
|---|---|---|---|---|
| 2005/0158134 A1* | 7/2005 | Roders | ............... | B23Q 11/001 409/202 |
| 2006/0018725 A1* | 1/2006 | Ichino et al. | ...... | B23Q 11/0035 409/131 |
| 2008/0111290 A1 | 5/2008 | Jenson | | |
| 2009/0298414 A1* | 12/2009 | Rijken | ............... | B23Q 11/0003 454/339 |
| 2010/0024206 A1 | 2/2010 | Mizuta et al. | | |

FOREIGN PATENT DOCUMENTS

| | | | |
|---|---|---|---|
| JP | 57184643 A | * | 11/1982 |
| JP | 60123237 A | * | 7/1985 |
| JP | H04-111747 | | 4/1992 |
| JP | 04315534 A | * | 11/1992 |
| JP | 05008147 A | * | 1/1993 |
| JP | 05-309536 | | 11/1993 |
| JP | 06-126564 | | 5/1994 |
| JP | 06134649 A | * | 5/1994 |
| JP | H07-266186 | | 10/1995 |
| JP | 10-249660 | | 9/1998 |
| JP | 10286734 A | * | 10/1998 |
| JP | 2001-054839 | | 2/2001 |
| JP | 2002-120570 | | 4/2002 |
| JP | 2002-239857 | | 8/2002 |
| JP | 2004066437 A | * | 3/2004 |
| JP | 2004-148426 | | 5/2004 |
| JP | 2010-188433 | | 9/2010 |
| JP | 2011073108 A | * | 4/2011 |
| JP | 2012066312 A | * | 4/2012 |
| KR | 100956126 B1 | * | 5/2010 |
| KR | 10-1134204 | | 4/2012 |
| WO | WO 2008/078519 | | 7/2008 |

OTHER PUBLICATIONS

English Language Abstract of JP 06-126564 published May 10, 1994.
English Language Translation of JP 06-126564 published May 10, 1994.
Chinese office Action issued in CN 201310280707.8 on Apr. 9, 2015 with English Language Translation.
English Language Abstract and Translation of JP 2001-054839 published on Feb. 27, 2001.
English Language Abstract of GB 1,063,904 published Apr. 5, 1967.
English Language Abstract of CN 201960408 published Sep. 7, 2011.
English Language Abstract and Translation of JP H07-266186 published Oct. 17, 1995.
Korean Office Action issued in KR Oct. 2013-0078153 on Sep. 1, 2014 with Englishg Language Translation.
English Language Abstract and Translation of JP 10-249660 published on Sep. 22, 1998.
English Language Abstract of KR 10-1134204 published on Apr. 9, 2012.
Japanese Office Action issued in JP 2012-151498 on Mar. 15, 2016 with an English Language Translation.
English Language Abstract and Machine Translation of JP 2002-239857 published on Aug. 28, 2002.
English Language Abstract and Machine Translation of JP 2002-120570 published on Apr. 23, 2002.
English Language Abstract and Machine Translation of JP 2010-188433 published on Sep. 2, 2010.
English Language Abstract and Machine Translation of JP H04-111747 published on Apr. 13, 1992 (also published as H07-106531).
English Language Abstract and Machine Translation of JP 2004-148426 published on May 27, 2004.

* cited by examiner

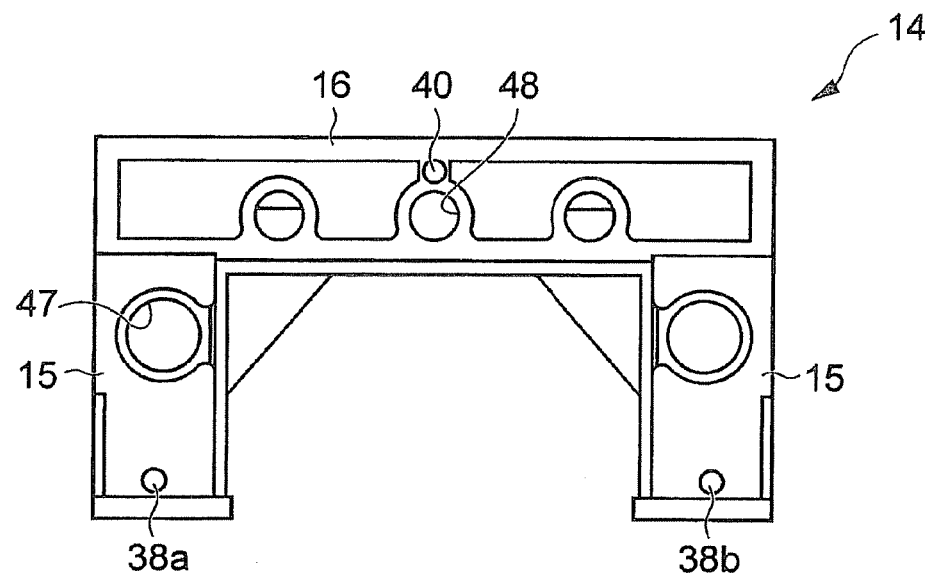
F I G. 2
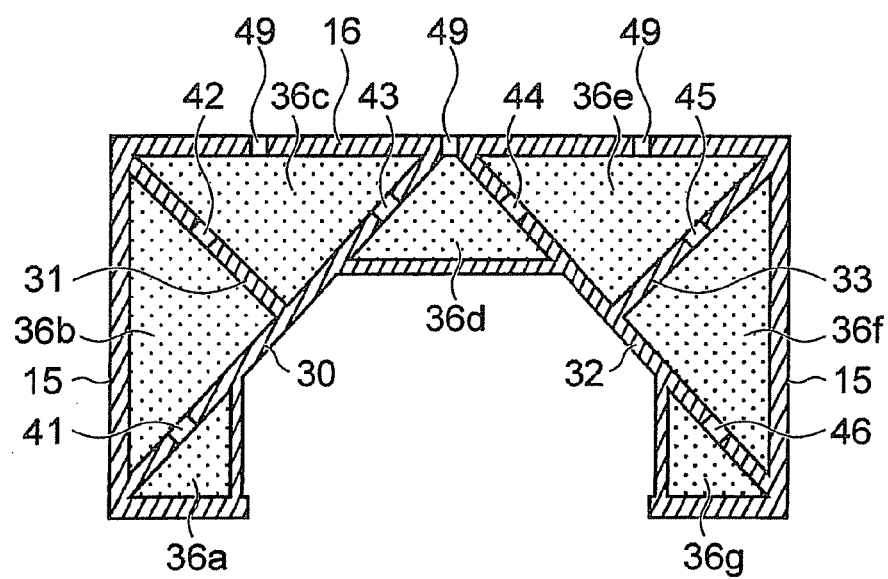
F I G. 3

PRECISION MACHINE TOOL

CROSS REFERENCE TO RELATED APPLICATIONS

This application claims priority to Japanese Patent Application No. 2012-151498 filed Jul. 5, 2013. The entirety of the above-listed applications is incorporated herein by reference.

FIELD OF THE INVENTION

The present invention relates to a precision machine tool. In particular, the present invention relates to a precision machine tool for machining a molding die for molding optical elements such as lenses, to an ultra-precision machining.

BACKGROUND ART

Recently, there have been developed precision machine tools such as vertical, horizontal or double-column precision machine tools or precision machine tools such as lathes, which are configured to machining, with high precision, molding dies for molding parts requiring a high machining precision, such as reflection mirrors and lenses of optical equipments.

A double-column machine tool is explained by way of example. The double-column type machine tool is a machine tool provided with a portal double-column in which a cross rail is horizontally extended between right and left columns mounted on opposed sides of a bed. A table is disposed between the right and left columns. A saddle holding a spindle head is disposed movably on the cross rail.

A conventional double-column type machine tool is generally of a large size, which is configured to machine large and long workpieces. However, a small-sized double-column type precision machine tool capable of carrying out a high-precision machining has been recently developed. Precision molding dies, which are used in producing parts related to precision parts and components of optical equipments, are machined by the small-sized double-column precision machine tool.

For example, in machining molding dies for use in molding optical components such as reflection mirrors and lenses, an ultra-precision accuracy in the order of submicrons or nanometers is required in order to machine a die surface into a high-precision mirror surface. In the case of machining of a die having such a high-precision mirror surface is machined, a time required for completion of finish machining is inevitably long. Thus, it is necessary that a change in environmental temperature from the beginning to the end of machining does not affect a machining precision. Vertical and horizontal precision machine tools and vertical and horizontal lathes have the same necessity.

Generally in machine tools, since a bed and a column are thermally deformed by a heat generated by a motor and a guide surface and/or a variation in temperature, the column and the bed are provided with pipes through which cooling water flow, as countermeasures against the thermal deformation. As a conventional technique for cooling a column, a column cooling structure disclosed in, e.g., JPS-309536A and JP6-126564A can be taken by way of example.

In the case of a double-column type precision machine tool and a vertical precision machine tool, a cutting direction (Z axis) of a tool is vertical, which is the same as a column. When the column is thermally deformed under the influence of variation in temperature, the machining accuracy is quickly degraded and an ultra-precise machining such as a mirror surface becomes impossible.

Similarly to other machining machines, a precision machine tool is conventionally provided with a cooling unit configured to supply a cooling water to heat generation sources such as a motor for driving a axis and a guide surface. Although a part of the cooling water is circulated in the column, only a restricted portion of the column can be cooled. Thus, only a restrictive effect can be brought about in the case of ultra-precision machining.

In order to solve this problem, a precision machine tool is installed in a thermostatic room or a temperature inside a cover surrounding the precision machine tool is controlled. However, such a thermostatic room is insufficient to restrain a thermal displacement of a column, which is caused by a heat generated from the machine tool itself and/or an environmental temperature change, to such a degree that an ultra-precision machining can be carried out. Furthermore, there is a problem in that these equipments are extremely expensive.

SUMMARY OF THE INVENTION

A column is originally a structure that is not intended to be used as a reservoir or a tank. Thus, it is difficult to thermally stabilize the column, only by supplying a cooling water to the column.

The object of the present invention is to provide an ultra-precision machine tool capable of effectively, thermally stabilizing a column and a bed, which are most susceptible to a change in environmental temperature, without requiring any additional equipment, so that an ultra-precision machining can be carried out even under a bad environment.

Another object of the present invention is to provide an ultra-precision machine tool capable of further improving a cooling effect, when the column also serves as a reservoir filled with a cooling water, so as to thermally stabilize the column regardless of variation in environmental temperature, whereby an ultra-precision machining can be carried out while a thermal displacement or deformation can be effectively restrained.

In order to achieve the aforementioned object, the present invention is a precision machine tool comprising:

a bed;

a column mounted on the bed; and a spindle head disposed on the column such that the spindle head is movable in the vertical direction;

wherein the column has an inner structure configured to be defined a water storage space for a reservoir adapted for storing temperature-conditioned cooling water.

In addition, the present invention is a precision machine tool comprising:

a bed;

a column mounted on the bed; and a spindle head disposed on the column such that the spindle head is movable in the vertical direction;

wherein the column has an inner structure configured to be defined a water storage space for a reservoir adapted for storing temperature-conditioned cooling water;

the column has, in a lower portion thereof, an intake port through which cooling water is charged into the water storage space;

the column has, in an upper portion thereof, a drain opening through which the cooling water is discharged outside; and an air vent hole through which air in the column is discharged is opened at a position higher than the drain opening. [claim 5].

BRIEF DESCRIPTION OF THE DRAWINGS

FIG. 2 is a front view of a portal double-column of the double-column type precision machine tool.

FIG. 3 is a longitudinal sectional view of the portal double-column shown in FIG. 2.

DETAILED DESCRIPTION OF THE PREFERRED EMBODIMENT

Embodiments of a precision machine tool according to the present invention will be described herebelow with reference to the attached drawings.

First Embodiment

Figure 1:
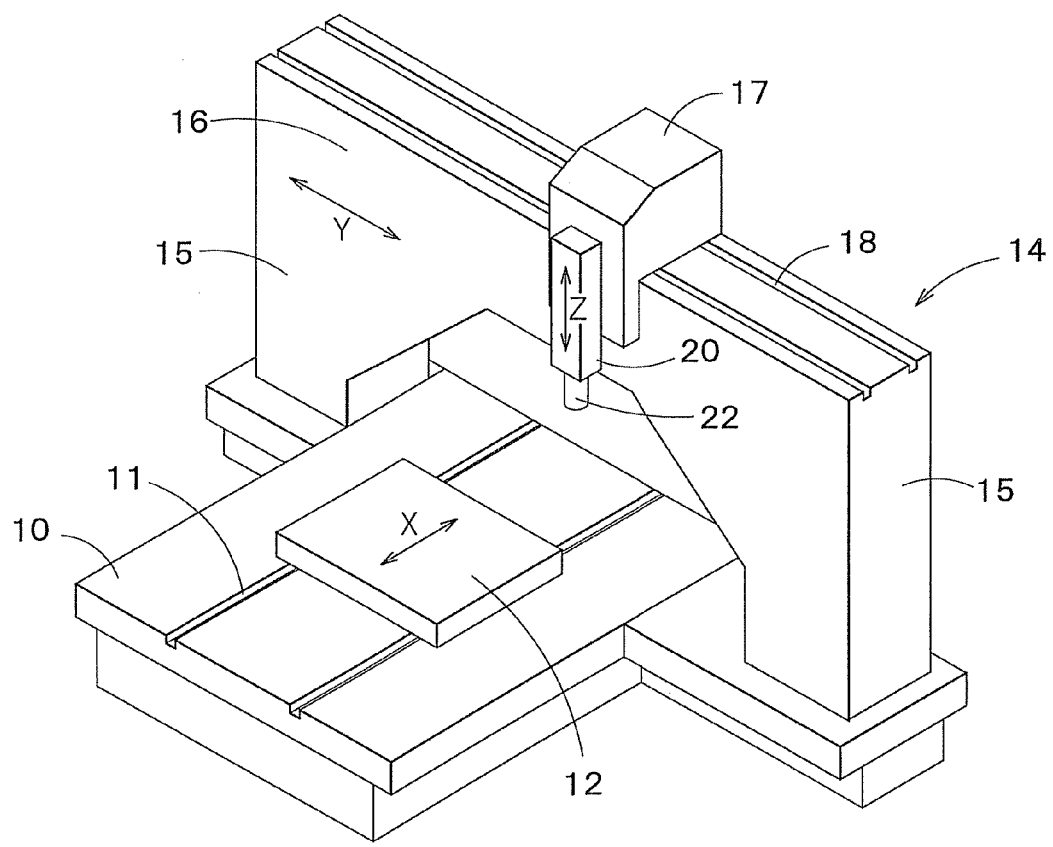
FIG. 1 is a perspective view showing a double-column type precision machine tool to which the present invention is applied.

FIG. 1 shows a double-column type precision machine tool to which the present invention is applied. In FIG. 1, the reference number 10 denotes a bed. A table 12 is disposed on the bed 10 such that the table 12 can be moved in the back and forth direction along a guide surface 11. The reference number generally shows a portal double-column. The portal double-column 14 is composed of a pair of columns 15 located on the left side and the right side of the table 12 on the bed 10 so as to extend vertically therefrom, and a cross rail 16 extending horizontally between the columns 15, 15.

In this embodiment, the portal double-column 14 is a casting structure in which the columns 15, 15 and the cross rail 16 are integrated with each other. The detailed structure of the portal double-column 14 is described hereafter.

A saddle 17 is disposed on an upper surface of the cross rail 16 such that the saddle 17 can be moved in the right and left direction along a guide surface 18. A spindle head 20 is held on the saddle 17, and a spindle 22 that moves in the vertical direction is provided in the spindle head 20. The double-column type precision machine tool is a machine tool configured to machine a workpiece with an ultra-precision machining in the order of sub-microns or nanometers. The spindle 22 is supported by high-speed pneumatic bearings, and can perform an ultrafast rotation as fast as 120000/minute at the maximum.

In such a double-column type precision machine tool, a X axis is an axis for controlling the movement of the table 12, a Y axis is an axis for controlling the movement of the saddle 17. A tool is positioned in a horizontal plane defined by the X axis and the Y axis. A Z axis is an axis for positioning the spindle 22 in the vertical direction. The Z axis mainly controls a cutting depth of the tool.

In the case of the double-column type precision tool machine, the positioning of the spindle 22 in the vertical direction is performed on the saddle 17 that moves along the guide surface 18 of the cross rail 16. The guide surface 18 is a so-called reference surface for the positioning in the vertical direction, i.e., on the Z axis. On the other hand, in the portal double-column 14, a vertical distance between the guide surface 18 and a workpiece set up on the table 12 is long. Thus, when the columns 15 and/or the cross rail 16, which constitute the portal double-column 14, are deformed thermally, a positioning precision of the tool on the Z axis is greatly affected. In the case of an ultra-precision machining in the order of sub-micron or nanometer, it takes a long time before a finish process such as a mirror-surface machining is completed. For this while, heat is continuously generated from each unit of the machine tool, so that a temperature environment changes. Thus, even a slight deformation of the portal double-column 14 caused by the temperature variation has a great impact on the positioning precision.

In this embodiment, in order to maintain the portal double-column 14 in a stable thermal condition, a following cooling-water storage space is formed inside the portal double-column 14 such that the portal double-column 14 itself can also serve as a cooling-water reservoir for storing temperature-conditioned cooling water.

FIG. 2 is a front view showing the portal double-column 14 and FIG. 3 is a view showing a cross section of the portal double-column 14.

The portal double-column 14 according to this embodiment is made up of a casting structure in which the columns 15, 15 and the cross rail 16 are integrated with each other. The portal double-column 14 has a hollow structure which is divided into a plurality of partitions where cooling-water reservoir spaces are formed. In this embodiment, the inside of the portal double-column 14 is divided, by using inclined partition walls 30, 31, 32 and 33 for ensuring rigidity, into first to seventh cooling-water reservoir 36a through 36g which are arranged symmetrically in the right and left direction.

An intake port 38a in communication with the first cooling-water reservoir 36a and an intake port 38b in communication with the seventh cooling-water reservoir 36g are formed in lower portions of the right and left columns 15. As described below, since the intake ports 38a and 38b also serve as drain ports through which cooling water is discharged from the columns 15, the intake ports 38a and 38b are preferably located on positions of the columns 15 as low as possible.

On the other hand, a drain hole 40 in communication with the fourth cooling-water reservoir 36d is formed on a high position in the center portion of the cross rail 16. The position of the drain hole 40 is preferably located as high as possible relative to the intake ports 38a and 38b, so as to be close nearly to the upper surface of the cross rail 16.

The first cooling-water storage compartment 36a and the second cooling-water reservoir 36b are communicated with each other through a cast hole 41 in the inclined partition wall 30. The second cooling-water reservoir 36b and the third cooling-water reservoir 36c are communicated with each other through a cast hole 42 in the inclined partition wall 31. The third cooling-water reservoir 36c and the fourth cooling-water reservoir 36d are communicated with each other through a cast hole 43 in the inclined partition wall 30. Similarly, the fourth cooling-water reservoir 36d and the fifth cooling-water reservoir 36e are communicated with each other through a cast hole 44 in the inclined partition wall 32. The fifth cooling-water reservoir 36e and the sixth cooling-water reservoir 36f are communicated with each other through a cast hole 45 in the inclined partition wall 33.

The sixth cooling-water reservoir 36f and the seventh cooling-water storage compartment 36g are communicated with each other through a cast hole 46 in the inclined partition wall 32.

In this embodiment, air vent holes 49 are provided to communicate with the third through fifth cooling-water reservoirs 36c, 36d and 36e respectively which are defined inside the cross rail 16. The air vent holes 49 are located on positions higher than the drain hole 40.

As shown in FIG. 2, cast holes 47 and 48 are formed in a front surface of the portal double-column 14 due to the necessity of casting process. These cast holes 47 and 48 are closed by covers.

Figure 4:
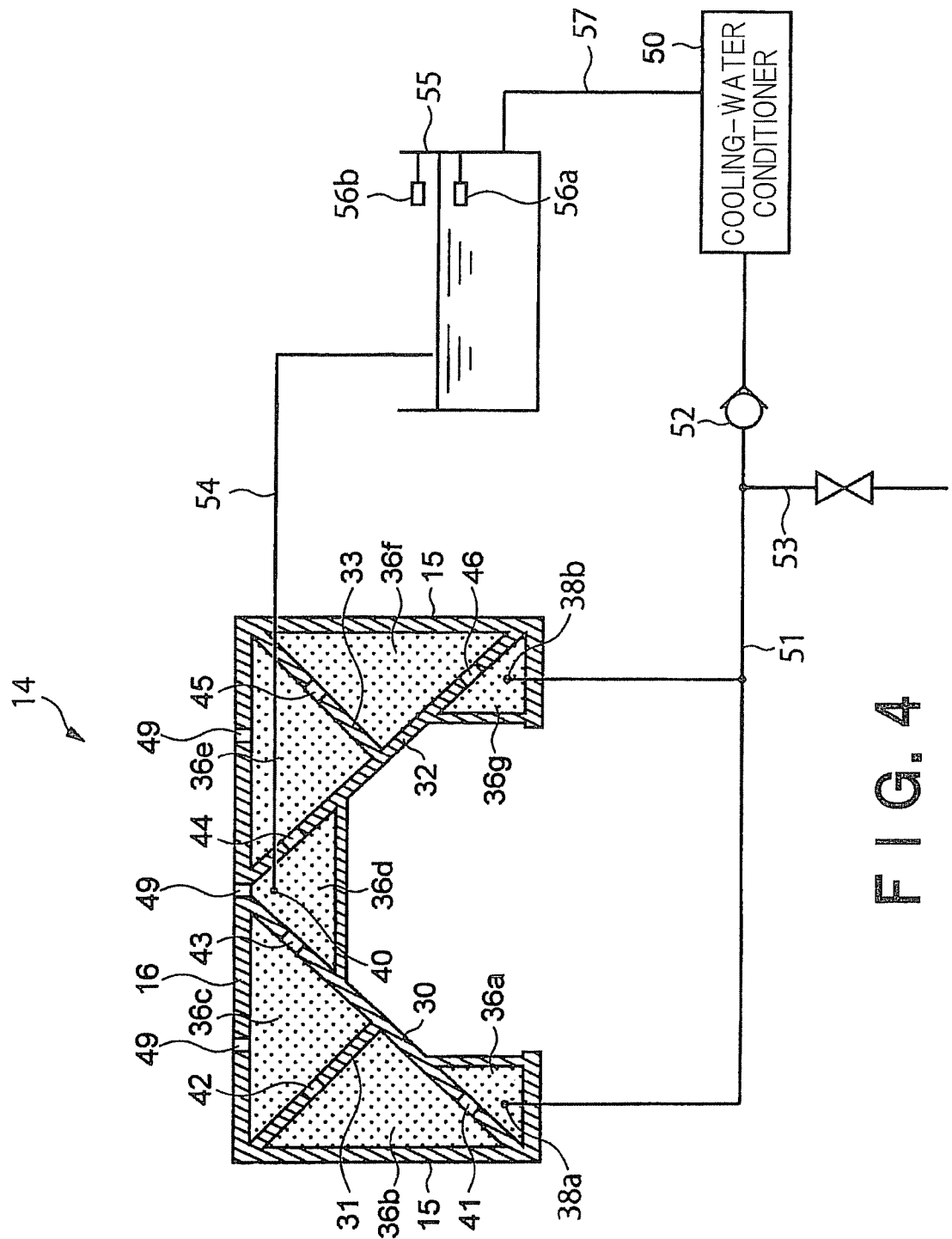
FIG. 4 is a system view of a cooling-water system of the double-column type precision machine tool.

FIG. 4 is a view showing a cooling-water circulation system in the double-column type precision machine tool. In FIG. 4, the reference number 50 denotes a cooling-water conditioner configured to control a temperature of cooling water to a desired constant value. The cooling-water conditioner 50 and the intake ports 38a and 38b of the portal double-column 14 are connected through a pipe 51. The pipe 51 is provided with a check valve 52 configured to prevent a back flow of cooling water from the portal double-column 14 to the cooling-water conditioner 50. A drain pipe 53 through which cooling water is drained from the portal double-column 14 branches off from the pipe 51.

Meanwhile, a cooling-water collecting pipe 54 extending from the drain hole 40 formed in the upper portion of the portal column 14 extends up to a cooling-water reservoir tank 55. The cooling-water reservoir tank 55 is a reservoir configured to store cooling water which is overflowing from the portal double-column 14. In this embodiment, the cooling-water reservoir tank 55 is provided with level sensors 56a and 56b for monitoring an volume of the cooling water. The level sensor 56a is configured to detect the lowest water level and the level sensor 56b is configured to detect the highest water level. The cooling-water reservoir tank 55 and the cooling-water conditioner 50 are connected to each other through a return pipe 57. Cooling water reserved in the cooling-water reservoir tank 55 is returned to the cooling-water conditioner 50 at a predetermined flow rate.

Water may be used as the cooling water. However, a water-soluble cooling liquid for controlling a temperature of a column, a bed or a table of a machine tool, such as Precise Fluid 2001 (trade name) manufactured by JX Nippon Oil & Energy Corporation, which is dissolved in water, is preferably used as the cooling water. The use of such a cooling liquid can enhance a heat exchange efficiency of cooling water, as well as improve a corrosion protection effect.

The precision machine tool according to this embodiment is as structured above. Next, an operation and an advantageous effect thereof are described.

In FIG. 4, cooling water maintained to a constant temperature is fed to the portal double-column 14 from the cooling-water conditioner 50 through the pipe 51. Cooling water is directed to the inside of the portal double-column 14 through the intake ports 38a and 38b formed in the lower portion of the portal double-column 14, so that each of the first to seventh cooling-water reservoirs 33a through 36g is filled with cooing water. Then, cooling water overflowed from the uppermost cooling-water reservoir 36d through the drain hole 40 is collected into the cooling-water reservoir tank 55 through the cooling-water collecting pipe 54. Cooling water reserved in the cooling-water reservoir tank 55 is cooled by the cooling-water conditioner 50 to a predetermined temperature, and then is again delivered to the portal double-column 14.

In this embodiment, the inside of the portal double-column 14 is filled with cooling water which is controlled at a constant temperature. Separately from the drain hole 40, the air vent holes 49 are provided in the upper portion of the portal double-column 14. Thus, as a water lever of the cooling water inside the portal double-column 14 goes up, air is discharged through the air vent holes 49. Thus, the inside of the portal double-column 14 can be filled with cooling water up to the level where the drain hole 40 is located, without any pneumatic pressure being applied to the surface of the cooling water. In addition, since the drain hole 40 is located in the upper part of the portal column 14, the inside of the portal double-column 14 as a whole can be filled up with cooling water as much as possible.

As described above, according to this embodiment, cooling water which is maintained at a predetermined temperature is stored all the time in the first cooling-water reservoir 36a through the seventh cooling-water reservoir 36g which are defined in the whole inside of the portal double-column 14. That is to say, the portal double-column 14 as a whole can work like a reservoir for storing temperature-conditioned cooling water.

Furthermore, inside the portal double-column 14, convection flow occurs in cooling water. The warmed up cooling water goes up so as to be discharged to the cooling-water reservoir tank 55 through the drain hole 40. For this while, cooling water is continuously charged to the inside of the portal double-column 14 from the cooling-water conditioner 50. Due to the arrangement of the drain hole 40 in the upper part of the portal double-column 14, increase in temperature of cooling water inside the portal double-column 14 can be restrained, whereby a desired cooling effect can be enhanced. Thus, the temperature of the portal double-column 14 can be maintained constant regardless of a change in environmental temperature.

Moreover, in this embodiment, in order that a constant amount of cooling water is reserved all the time inside the portal double-column 14, a circulation system is constructed such that cooling water overflowed from the drain hole 40 is temporarily collected in the cooling-water reservoir tank 55, and that cooling water is supplied from the cooling-water reservoir tank 55 to the cooling-water conditioner 50. Since cooling water overflowed from the drain hole 40 is reserved in the cooling-water reservoir tank 55, the portal double-column 14 is filled with a constant amount of cooling water all the time. According to this embodiment, in the cooling-water reservoir tank 55, a level of cooling water is monitored by the level sensors 56a and 56b which detects a level of cooling water. When the level of cooling water falls under the lowest level, the level sensor 56b detects the situation. To the contrary, when the level of the cooling water exceeds the uppermost level, the level sensor 56a detects the situation. Thus, shortage of cooling water and a superfluity of cooling water can be successfully prevented.

As described above, according to this embodiment, even in the double-column type precision machine tool having the portal double-column 14 which is susceptible to an influence of a temperature variation because the tool cutting direction (Z axis) is vertical so that a distance between a workpiece and the guide surface 18 of the cross rail 16 becomes longer, the inside of the portal double-column 14 is filled all the time with temperature-conditioned cooling water, and the cooling water having been charged through the intake ports 38a and 38b in the lower part of the column is caused to overflow through the drain hole 40 in the upper part of the column, whereby a cooling effect can be improved. Thus, the thermal condition of the portal double-column 14 can be maintained constant not partially but totally for a long period of time. Thus, this embodiment contributes to achievement of a long lasting ultra-precision machining in the order of nanometers such as a high-precision mirror surface machining on a workpiece.

In addition, unlike a case in which the machine tool is installed in a thermostatic room or an apparatus for controlling a temperature inside a cover surrounding the machine tool is provided, this embodiment utilizes the original casting structure of the portal double-column. Thus, without requiring any additional equipment, the column, which is most susceptible to change in environmental temperature, can be protected from an influence of temperature variation and can be thermally stabilized at a lower cost.

Second Embodiment

Next, a second embodiment is described with reference to FIG. 5. In the second embodiment, in addition to the portal double-column 14 of the double-column type precision machine tool of FIG. 1, a cooling-water reservoir to be filled with temperature-conditioned cooling water is defined inside the spindle head 20 or inside the bed 10.

Figure 5:
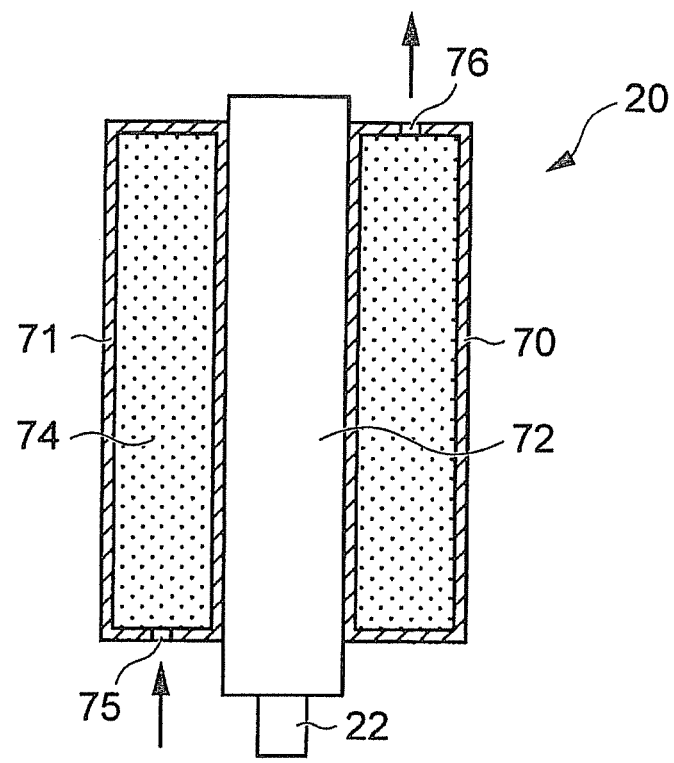
FIG. 5 is a sectional view of a spindle head of a precision machine tool in a second embodiment of the present invention.

In FIG. 5, a rectangular parallelepiped body 70 constituting a spindle head 20 is a hollow casting of an integral structure. A tubular wall 71 is formed in a central portion. An inside of the tubular wall 71 defines a hole in which a spindle driving unit 72, which includes a high-speed pneumatic bearing for supporting a spindle 22 and a servomotor, is built in. Inside the body 70 of the spindle head 20, an outside of the tubular wall 71 provides a cooling-water reservoir 74 in which cooling water is stored. Cooling water, which is kept at a constant temperature by the cooling-water temperature conditioner 50 shown in FIG. 4, is charged from a cooling-water inlet 75. A cooling-water outlet 76 is formed in the body 70 of the spindle head 20. Cooling water led out from the cooling-water outlet 76 is returned to the cooling-water conditioner 50 through the cooling-water reservoir tank 55.

In the second embodiment, taking advantage of a casting structure of the body 70, the spindle head 20 also has therein the cooling-water reservoir 74. Thus, the whole spindle head 20, which is a major heat generation source in the machine tool, can be effectively maintained at a constant temperature with a low cost.

Figure 6:
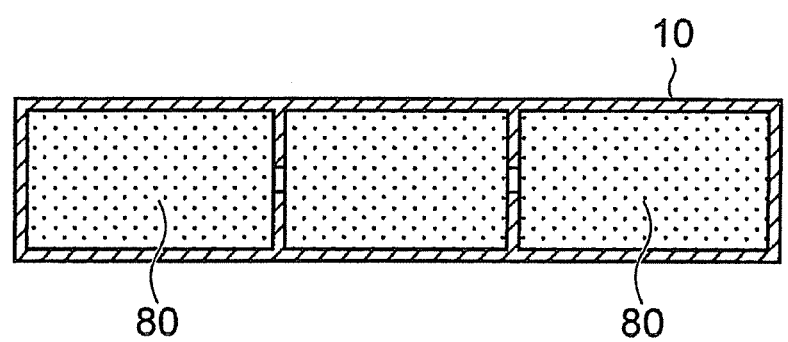
FIG. 6 is a sectional view of a bed of the precision machine tool in the second embodiment of the present invention.

Similarly in the embodiment, as shown in FIG. 6, a plurality of cooling-water reservoirs 80 are formed by partition walls inside a bed 10. Cooling water, which is conditioned at a constant temperature by the cooling-water conditioner 50, is delivered into these cooling-water reservoirs 80 through an inlet hole, not shown. Cooling water is returned to the cooling-water conditioner 50 through a pipe connected to an outlet hole, not shown, via a cooling-water reservoir tank 55. Since the cooling-water reservoirs 80 inside the bed 10 are filled with cooing water which is conditioned at a constant temperature, the whole bed 10 can be effectively maintained at a constant temperature Third Embodiment Next, a third embodiment of the present invention is described with reference to FIG. 7. In the third embodiment, the present invention is applied to a horizontal precision machine tool. The same components as those of the first embodiment shown in FIG. 1 are shown by the same reference numbers and detailed description thereof is omitted.

Figure 7:
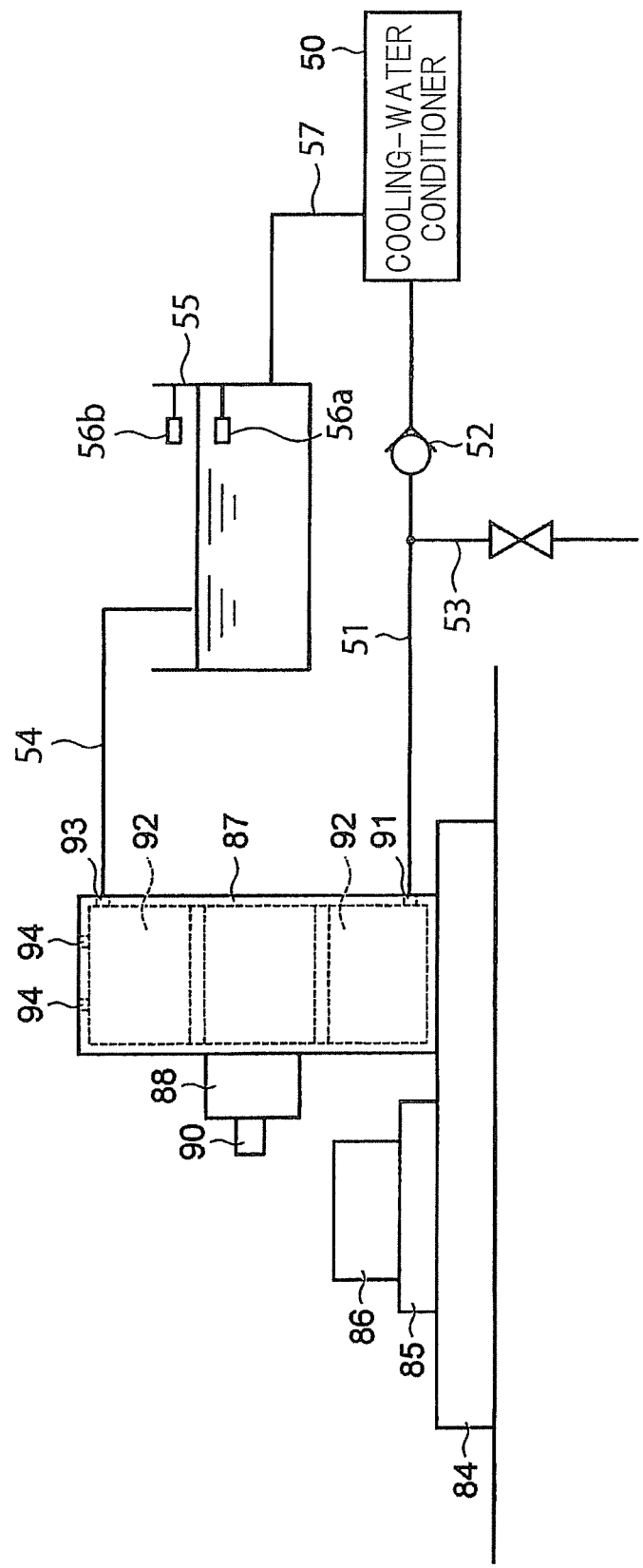
FIG. 7 is a view showing a cooling-water system of a horizontal precision machine tool in a third embodiment of the present invention.

In FIG. 7, the reference number 84 denotes a bed. A saddle 85 is disposed on the bed 84 such that the saddle 85 can be moved in the back and forth direction. A table 86 is disposed on the saddle 85 such that the table 86 can be moved in the right and left direction. A spindle head 88 is held on a column 87 mounted on the bed 84 such that the spindle head 88 can be moved in the vertical direction. A spindle 90 is supported horizontally by the spindle head 88.

In the horizontal precision machine tool in this embodiment, making the most of the column 87 which is a casting, a plurality of cooling-water reservoirs 92 are partitioned inside the column 87. Cooling water delivered by a cooling-water conditioner 50 is charged into the cooling-water reservoirs 92 through an intake port 91 provided in a lower portion of the column 87. Similarly to the first embodiment, in order that a constant amount of cooing water is stored all the time, a circulation system is constructed such that cooling water overflowed from a drain hole 93 is temporarily collected and stored in a cooling-water reservoir tank 55, and that cooling water is supplied from the cooling-water reservoir 55 to a cooling-water conditioner 50. In addition, separately from the drain hole 93, an air vent hole 94 is formed at a position higher than the drain hole 93.

Since the air vent hole 94 is provided apart from the drain hole 93, the inside of the column 87 can be filled with cooling water as a whole up to the height where the drain hole 93 is located, without any pneumatic pressure being applied to the surface of the cooling water in the column 87. In addition, cooling water is caused to overflow forcibly through the drain hole 93 in the upper part of the column 87, whereby a cooling effect can be improved. Thus, the thermal condition of the column 87 can be kept unchanged not partially but totally for a long period of time. Thus, this embodiment contributes to achievement of a long lasting ultra-precision machining such as a high-precision mirror surface machining on a workpiece.

In the third embodiment, there is shown the example in which the column of the horizontal precision machine tool is structured as a cooling water reservoir. However, a column of a vertical precision machine tool, in which a spindle is vertically supported, can also be structured as a cooling water reservoir.

In addition, like the second embodiment, in a vertical or horizontal precision machine tool, a cooling-water reservoir may be formed inside a spindle head or a bed.

Hereabove, the precision machine tool according to the present invention are described by taking the suitable embodiments as examples. However, the present invention may be applied to a column and a spindle head consisted of a sheet metal structure in addition to a casting. Further, the present invention may be applied to a bed of a precision lathe.

What is claimed is:

1. A precision machine tool comprising:
   a bed;
   a portal double-column including a pair of columns mounted on a left side and a right side of the bed and a horizontal cross rail carried by the pair of columns, wherein the inner structure of the columns and the cross rail is divided into a plurality of cooling-water storage spaces by inclined partition walls; and
   a spindle head disposed on the cross rail and movable in the vertical direction;
   wherein the portal double-column including the cross rail and the pair of columns has an inner structure defining a water storage space for a reservoir adapted for storing temperature-conditioned cooling water; and
   wherein the spindle head has an inner structure defining a water storage space for a reservoir adapted for storing temperature-conditioned cooling water.

2. The precision machine tool according to claim 1, wherein the bed has an inner structure defining a water storage space for a reservoir adapted for storing temperature-conditioned cooling water.

3. A precision machine tool comprising:
   a bed;
   a portal double-column including a pair of columns mounted on a left side and a right side of the bed and a horizontal cross rail carried by the pair of columns, wherein an inner structure of the columns and the cross rail is divided into a plurality of cooling-water storage spaces by inclined partition walls, the cooling-water storage spaces defining a reservoir adapted for storing temperature-conditioned cooling water; and
   a spindle head disposed on the cross rail and movable in the vertical direction;
   wherein the portal double-column has, in a lower portion thereof, an intake port through which the cooling water is charged into the water storage space;
   wherein the portal double-column has, in an upper portion thereof, a drain opening through which the cooling water is discharged outside; and
   wherein the portal double-column has an air vent hole through which air in the column is discharged, the air vent hole being disposed at a position higher than the drain opening; and
   wherein the spindle head has an inner structure defining a water storage space for a reservoir adapted for storing temperature-conditioned cooling water.

4. The precision machine tool according to claim 3, further comprising a cooling-water circulation system comprising:
   a cooling-water reservoir tank configured to collect a cooling water having overflowed from the drain opening; and
   a cooling-water conditioner configured to control a temperature of cooling water supplied by the cooling-water reservoir tank and to feed temperature-conditioned cooling water to the intake port.

5. The precision machine tool according to claim 4, wherein the cooling-water reservoir tank is provided with a level sensor configured to detect a water surface level of cooling water reserved in the cooling-water reservoir tank.

6. The precision machine tool according to claim 4, wherein the intake port and the cooling-water temperature conditioner are connected by a pipe provided with a check valve configured to prevent cooling water from flowing backward to the cooling-water conditioner.

7. The precision machine tool according to claim 3, wherein the portal double-column comprises a casting in which the columns and the cross rail are molded to form an integrated structure.

8. The precision machine tool according to claim 1, further comprising:
   a table disposed between the right and left columns such that the table is movable in the back and forth direction (X-axis direction), and
   a saddle disposed on the cross rail such that the saddle is movable in the right and left direction (Y-axis direction); wherein
   the spindle head is disposed on the saddle, the spindle head having a spindle that is movable in the vertical direction (Z-axis direction).

9. The precision machine tool according to claim 1, wherein the cooling water includes a water-soluble cooling liquid in water for controlling a temperature of the column or the bed of the machine tool.

10. The precision machine tool according to claim 1, wherein the bed has an inner structure defining a water storage space for a reservoir adapted for storing temperature-conditioned cooling water.

11. The precision machine tool according to claim 3, further comprising:
    a table disposed between the right and left columns such that the table is movable in the back and forth direction (X-axis direction), and
    a saddle disposed on the cross rail such that the saddle is movable in the right and left direction (Y-axis direction); wherein
    the spindle head is disposed on the saddle, the spindle head having a spindle that is movable in the vertical direction (Z-axis direction).

12. The precision machine tool according to claim 3, wherein the cooling water includes a water-soluble cooling liquid in water for controlling a temperature of the column or the bed of the machine tool.

* * * * *